United States Patent
Lee et al.

(10) Patent No.: US 6,640,112 B1
(45) Date of Patent: Oct. 28, 2003

(54) REPEATING METHOD FOR A WIRELESS COMMUNICATION SYSTEM AND APPARATUS THEREOF

(75) Inventors: Jin-Woo Lee, Seoul (KR); Byung-Kook Choi, Seoul (KR); Jong-Ok Kim, Seoul (KR); Jung-Hwan Byun, Seoul (KR); Chang-Yun Kim, Seoul (KR)

(73) Assignee: Shinsegi Telecomm, Inc., Seoul (KR)

( * ) Notice: Subject to any disclaimer, the term of this patent is extended or adjusted under 35 U.S.C. 154(b) by 471 days.

(21) Appl. No.: 09/696,320

(22) Filed: Oct. 25, 2000

(30) Foreign Application Priority Data

Oct. 29, 1999 (KR) .......................... 1999-47477

(51) Int. Cl.[7] .............................. H04B 1/38; H04M 1/00
(52) U.S. Cl. ................ 455/562.1; 455/11.1; 455/279.1; 455/561
(58) Field of Search ................. 455/562, 11.1, 455/422, 561, 273, 276.1, 272, 101, 65, 279.1, 278.1, 16, 15, 18; 370/315, 335, 342

(56) References Cited

U.S. PATENT DOCUMENTS

| | | | | |
|---|---|---|---|---|
| 5,832,365 A | * | 11/1998 | Chen et al. | 455/15 |
| 5,918,154 A | * | 6/1999 | Beasley | 455/11.1 |
| 6,014,546 A | * | 1/2000 | Georges et al. | 455/14 |
| 6,035,218 A | * | 3/2000 | Oh et al. | 455/562 |
| 6,078,823 A | * | 6/2000 | Chavez et al. | 455/562 |

* cited by examiner

Primary Examiner—Nay Maung
Assistant Examiner—John J Lee
(74) Attorney, Agent, or Firm—Dorsey & Whitney LLP

(57) ABSTRACT

A repeating method for a wireless communication system which provides time and space diversities, and an apparatus thereof are disclosed. The method of repeating a forward link communication signal for a wireless communication system includes the steps of: a) transmitting the forward link communication signal through a first transmitting antenna; b) delaying the forward link communication signal for a predetermined time period; and c) transmitting a delayed forward link communication signal which is generated by step b) through a second transmitting antenna. According to the method, when repeating forward and reverse link communication signals, time and space diversities are respectively provided to the base station and the mobile stations.

3 Claims, 3 Drawing Sheets

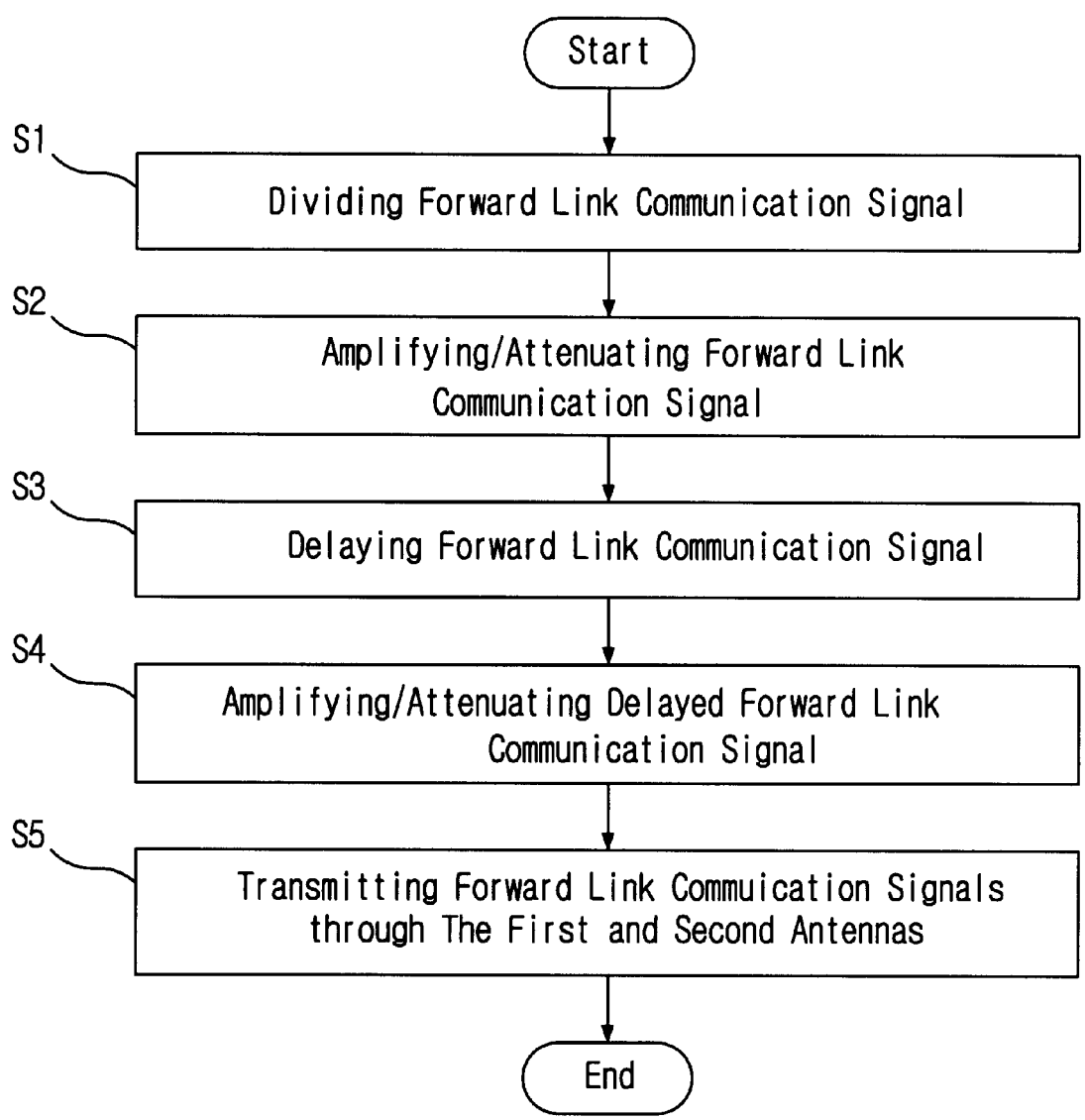

REPEATING METHOD FOR A WIRELESS COMMUNICATION SYSTEM AND APPARATUS THEREOF

BACKGROUND OF THE INVENTION

1. Field of the Invention

The present invention relates to a wireless communication system, more particularly to a repeating method for a wireless communication system which provides time and space diversities, and an apparatus which performs the method.

2. Prior Art

In a wireless communication system, a repeater is generally used for extending a service coverage of a base station and enhancing system performance in a service area.

When a mobile station is placed at in-building, particularly an upper floor, the receiving sensitivity of the mobile station is degraded because of interference by adjacent base stations. This degradation causes problems such as a call drop, call setup and handoff failures, etc.

Furthermore, because mobile stations, as consumer products, are tightly limited, improvements in performance by requesting mobiles station providers to manufacture mobile stations with improved receiving sensitivity is limited. Therefore, service providers install repeaters, distributed antennas, or the like into buildings to service a wireless communication into buildings.

However, it is very expensive to install the repeaters or distributed antennas into all buildings.

SUMMARY OF THE INVENTION

It is an object of the present invention to provide an improved repeating method for a wireless communication system and an apparatus thereof.

It is another object of the present invention to provide a repeating method which can improve service quality in buildings without installing repeaters or distributed antennas into the buildings.

It is a further object of the present invention to provide a method of repeating a forward link communication signal which can provide time and space diversities to receiving sites and an apparatus which can perform the method.

In order to achieve the above objects, a method according to one aspect of the present invention includes a) transmitting a forward link communication signal through a first transmitting antenna; b) delaying the forward link communication signal for a predetermined time period; and c) transmitting a delayed forward link communication signal which is generated by step b) through a second transmitting antenna.

An apparatus according to another aspect of the present invention includes means for transmitting a forward link communication signal through a first transmitting antenna; means for delaying the forward link communication signal for a predetermined time period; and means for transmitting a delayed forward link communication signal which is generated by the delaying means through a second transmitting antenna.

According to the present invention, a method and an apparatus for repeating a forward link communication signal are provided, which can provide the time and space diversities to the sites of receiving the forward link communication signal.

BRIEF DESCRIPTION OF THE DRAWINGS

This invention will be better understood and its various objects and advantages will be more fully appreciated from the following description taken in conjunction with the accompanying drawings, in which:

FIG. 3 is a flow chart for illustrating the process of repeating a forward link communication signal of the repeater.

DETAILED DESCRIPTION OF THE PREFERRED EMBODIMENT

Preferred embodiments of the present invention will be illustrated below with reference to the accompanying drawings.

Figure 1:
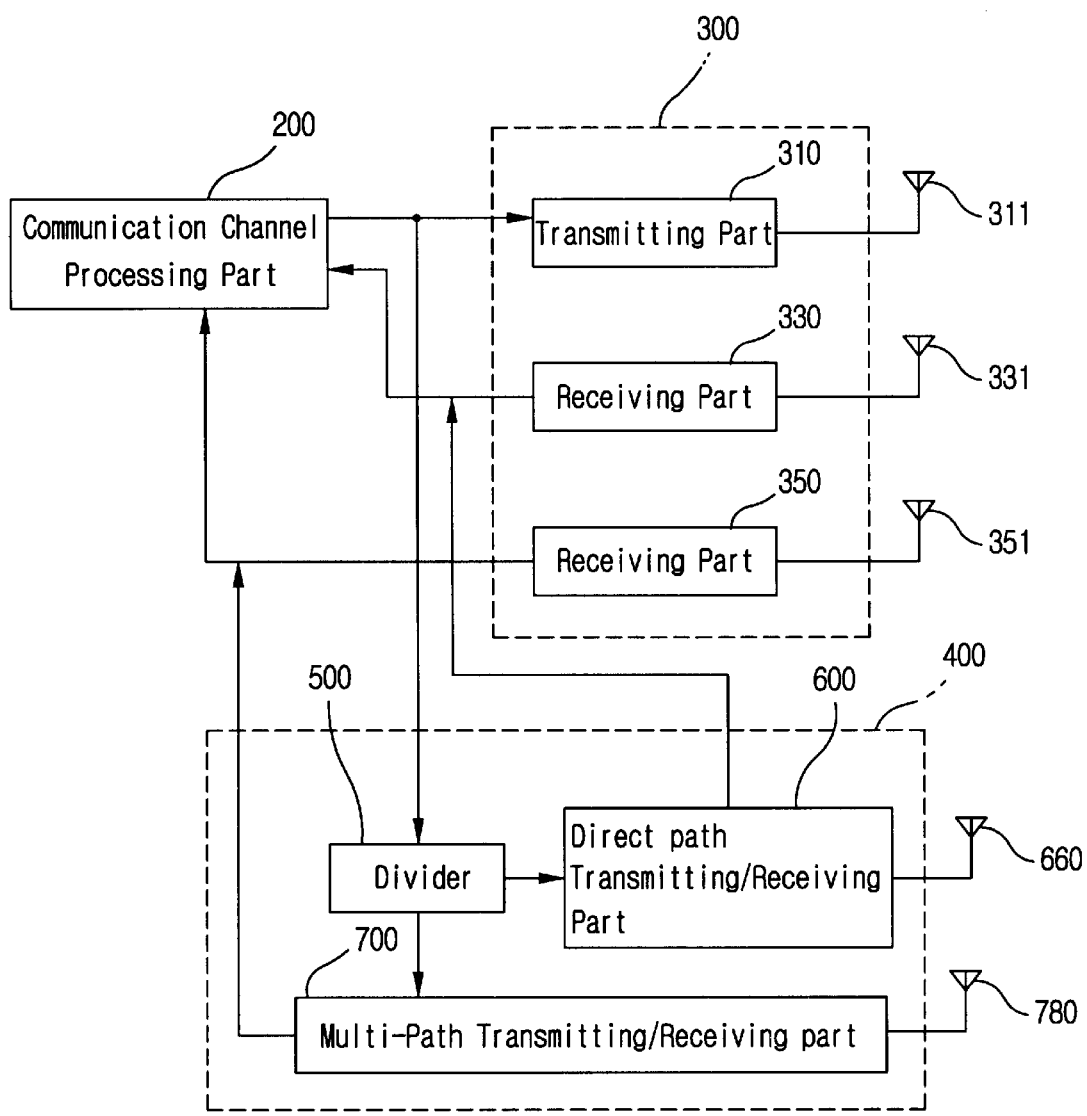
FIG. 1 is a block diagram for showing a base station employing a repeater according to one embodiment of the present invention.

FIG. 1 is a block diagram for showing a base station 100 employing a repeater according to one embodiment of the present invention.

Referring to FIG. 1, the base station 100 includes a communication channel processing part 200, a transmitting/receiving part 300, and a repeater 400 according to the present invention.

The communication channel processing part 200 generates a forward link communication signal, and processes reverse link communication signals from the transmitting/receiving part 300 and the repeater 400. For example, if the base station is an IS-95 base station, the communication channel processing part 200 generates a baseband digital signal of having traffic and overhead information and converts the baseband digital signal into an analog signal thereby to generate the forward link communication signal.

The transmitting/receiving part 300 amplifies the forward link communication signal and transmits the amplified forward link communication through a transmitting antenna 311. Further, the transmitting/receiving part 300 detects reverse link communication signals from signals received by each of both the first receiving antenna 331 and the second receiving antenna 351, and provides the reverse link communication signals to the communication channel processing part 200.

Preferably, the transmitting/receiving part 300 includes a transmitting part 310, and the first and second receiving parts 330 and 350. The transmitting part 310 amplifies the forward link communication signal and transmits the amplified forward link communication signal through the transmitting antenna 311. The first and second receiving parts 330 and 350 detect the reverse link communication signals from the signals received by the first receiving antennas 331 and 351, and provide the reverse link communication signals to the communication channel processing part 200, respectively.

The repeater 400, according to the present invention, includes a divider 500, a direct path transmitting/receiving part 600, and a multi-path transmitting/receiving part 700.

The divider 500 provides the forward link communication signal to the direct path transmitting/receiving part 600 and a multi-path transmitting/receiving part 700, respectively.

The direct path transmitting/receiving part 600 transmits the forward link communication signal from the divider 500 through a first transmitting/receiving antenna 660. And, the direct path transmitting/receiving part 600 detects a first reverse link communication signal from signals received by the first transmitting/receiving antenna 660, and provides the first reverse link communication signal to the communication channel processing part 200.

Figure 2:
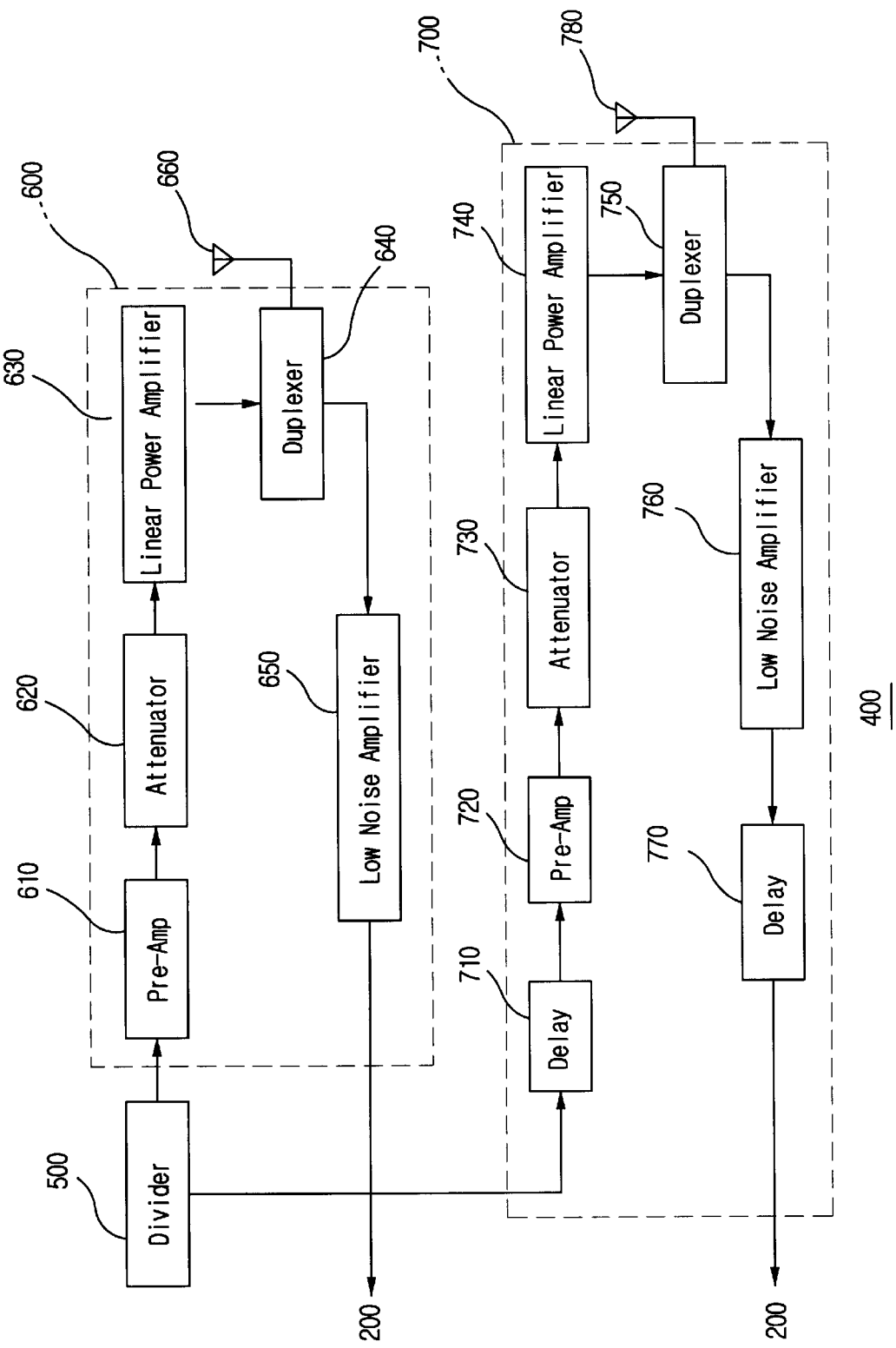
FIG. 2 is a block diagram for illustrating the repeater depicted in FIG. 1.

Preferably, as shown in FIG. 2, the direct path transmitting/receiving part 600 includes a first pre-amplifier 610, a first attenuator 620, a first linear power amplifier 630, a first duplexer 640, and first low noise amplifier 650.

The first pre-amplifier 610 amplifies the forward link communication signal from the divider 500, and provides a first amplified forward link communication signal to the first attenuator 620.

The first attenuator 620 attenuates the first amplified forward link communication signal from the first pre-amplifier 610, and provides a first attenuated forward link communication signal to the first linear power amplifier 630.

The first linear power amplifier 630 linearly amplifies the first attenuated forward link communication signal from the first attenuator 620, and transmits a first linear amplified forward link communication signal through the first duplexer 640 and the first transmitting/receiving antenna 660.

The first duplexer 640 provides the first linearly amplified forward link communication signal to the first transmitting/receiving antenna 660, and provides the first reverse link communication signal received by the first transmitting/receiving antenna 660 to the first low noise amplifier 650.

The first low noise amplifier 650 amplifies the first reverse link communication signal from the first duplexer, and provides the first reverse link communication signal to the communication channel processing part 200.

The multi-path transmitting/receiving part 700 delays the forward link communication signal from the divider 500 for a first predetermined time period in order to generate a delayed forward link communication signal, and transmits the delayed forward link communication signal through the second transmitting/receiving antenna 780. Further, the multi-path transmitting/receiving part 700 delays a second reverse link communication signal received by the second transmitting/receiving antenna 780 for a second predetermined time period, and outputs the second reverse link communication signal to the communication channel processing part 200.

Preferably, as shown in FIG. 2, the multi-path transmitting/receiving part 700 includes the first delay 710, the second pre-amplifier 720, the second attenuator 730, the second linear power amplifier 740, the second duplexer 750, the second low noise amplifier 760, and the second delay 770.

The first delay 710 delays the forward link communication signal for the first predetermined time period to generate the delayed forward link communication signal, and provides the delayed forward link communication signal to the second preamplifier 720.

The second pre-amplifier 720 amplifies the delayed forward link communication signal from the first delay 710 to generate the second amplified forward link communication signal, and provides the second amplified forward link communication signal to the second attenuator 730.

The second attenuator 730 attenuates the second amplified forward link communication signal from the second pre-amplifier 720 to generate the second attenuated forward link communication signal, and provides the second attenuated forward link communication signal to the second linear power amplifier 740.

The second linear power amplifier 740 linearly amplifies the second attenuated forward link communication signal from the second attenuator 730 to generate the second linearly amplified forward link communication signal, and provides the second linearly amplified forward link communication signal to the second duplexer 750.

The second duplexer 750 provides the second linearly amplified forward link communication signal from the second linear power amplifier 740 to the second transmitting/receiving antenna 780 to transmit the second linearly amplified forward link communication signal through the second transmitting/receiving antenna 780. Further, the second duplexer 750 provides the second reverse link communication signal received by the second transmitting/receiving antenna 780 to the second low noise amplifier 760.

The second low noise amplifier 760 amplifies the second reverse link communication signal from the second duplexer 750 and provides the second amplified reverse link communication signal to the second delay 770.

The second delay 770 delays the second amplified reverse link communication signal from the second low noise amplifier 760 for the second predetermined time period to generate the delayed reverse link communication, and provides the delayed reverse link communication signal to the communication channel processing part 200.

Hereinafter, the operation of the repeater 400 according to the present invention will be described with reference to FIG. 3.

FIG. 3 is a flow chart for illustrating the process of repeating a forward link communication signal of the repeater 400.

First, describing the process of repeating the forward link communication signal, when the forward link communication signal is inputted from the communication channel processing part 200 to the divider 500, the divider 500 provides the forward link communication signal to the direct path transmitting/receiving part 600 and the multi-path transmitting/receiving part 700, respectively(S1).

When the forward link communication signal is inputted to the direct path transmitting/receiving part 600, the forward link communication signal is amplified and attenuated by the first pre-amplifier 610 and the first attenuator 620(S2).

On the other hand, the forward link signal which is inputted to the multi-path transmitting/receiving part 700 is delayed for the first predetermined time period by the first delay 710(S3).

Then, the delayed forward link communication signal is amplified and attenuated by the second pre-amplifier 720 and the second attenuator 730(S4).

The forward link communication signals which are amplified and attenuated by steps 2 and 4 are linearly amplified by the first and second linear power amplifiers 630 and 740. And then, the forward link communication signals are transmitted through the first and second transmitting/receiving antennas 660 and 780, respectively(S5).

Describing the process of repeating the reverse link communication signal, the first reverse link communication received by the first transmitting/receiving antenna 660 is provided through the first duplexer 640 to the first low noise amplifier 650. The first low noise amplifier 650 amplifies the reverse link communication signal and provides the first amplified reverse link communication signal to the communication channel processing part 200.

On the other hand, the second reverse link communication signal received by the second transmitting/receiving antenna 780 is inputted through the second duplexer 750 to the second low noise amplifier 760. The second low noise amplifier 760 amplifies the second reverse link communication signal and outputs the second amplified reverse link communication signal to the second delay 770. Then, the second delay 770 delays the second amplified reverse link communication signal for the second predetermined time period and provides the delayed reverse link communication signal to the communication channel processing part 200.

According to the present invention, when repeating forward and reverse link communication signals, time and space diversities are respectively provided to the base station and the mobile stations, such that the service quality of wireless communication system is enhanced.

While this invention has been particularly shown and described with reference to particular embodiments thereof, it will be understood by those skilled in the art that various changes in form and details may be effected therein without departing from the spirit and scope of the invention as defined by the appended claims.

What is claimed is:

1. A repeater for a wireless communication system comprising:

a direct path transmitting/receiving part for transmitting a forward link communication signal through a first transmitting/receiving antenna, and for outputting a first reverse link communication signal received by the first transmitting/receiving antenna; and a multi-path transmitting/receiving part for delaying the forward link communication signal for a first predetermined time period in order to generate a delayed forward link communication signal, transmitting the delayed forward link communication signal through a second transmitting/receiving antenna, delaying a second reverse link communication signal received by the second transmitting/receiving antenna for a second predetermined time period in order to generate a delayed reverse link communication signal, and outputting the delayed reverse link communication signal.

2. A repeater as claimed in claim 1, wherein the direct path transmitting/receiving part includes:

a first pre-amplifier for amplifying the forward link communication signal;

a first attenuator for attenuating a first amplified forward link communication signal from the first pre-amplifier;

a first linear power amplifier for linearly amplifying a first attenuated forward link communication signal from the first attenuator;

a first duplexer for providing a first linearly amplified forward link communication signal from the first linear power amplifier to the first transmitting/receiving antenna and providing the first reverse link communication signal to a first low noise amplifier; and the first low noise amplifier for amplifying the first reverse link communication signal from the first duplexer.

3. A repeater as claimed in claim 1, wherein the multi-path transmitting/receiving part includes:

a first delay for delaying the forward link communication signal for the first predetermined time period;

a second pre-amplifier for amplifying the delayed forward link communication signal from the first delay;

a second attenuator for attenuating a second amplified forward link communication signal from the second pre-amplifier;

a second linear power amplifier for linearly amplifying a second attenuated forward link communication signal from the second attenuator;

a second duplexer for providing a second linearly amplified forward link communication signal from the second linear power amplifier to the second transmitting/receiving antenna and providing the second reverse link communication signal received by the second transmitting/receiving antenna to a second low noise amplifier;

the second low noise amplifier for amplifying the second reverse link communication signal from the duplexer; and a second delay for delaying an amplified reverse link communication signal from the second low noise amplifier for the second predetermined time period.

* * * * *